United States Patent
Chan (10) Patent No.: US 9,046,408 B2
(45) Date of Patent: Jun. 2, 2015

(54) LOAD CELL ASSEMBLY FOR AN ELECTRICAL SCALE

(71) Applicant: MEASUREMENT LTD, Grand Cayman (KY)

(72) Inventor: Po Sang Chan, Kowloon (HK)

(73) Assignee: Measurement Ltd., Grand Cayman (KY)

( * ) Notice: Subject to any disclaimer, the term of this patent is extended or adjusted under 35 U.S.C. 154(b) by 115 days.

(21) Appl. No.: 13/826,297

(22) Filed: Mar. 14, 2013

(65) Prior Publication Data
US 2014/0008133 A1   Jan. 9, 2014

(30) Foreign Application Priority Data

Jul. 4, 2012  (CN) .......................... 2012 2 0320935

(51) Int. Cl.
*G01G 3/14* (2006.01)
*G01G 21/02* (2006.01)
*G01G 21/23* (2006.01)
*G01G 19/44* (2006.01)

(52) U.S. Cl.
CPC .................. *G01G 3/14* (2013.01); *G01G 21/02* (2013.01); *G01G 21/23* (2013.01); *G01G 19/44* (2013.01); *Y10S 177/09* (2013.01)

(58) Field of Classification Search
CPC ..... G01G 3/1402; G01G 19/44; G01G 21/23; G01G 21/02; Y10S 177/09
USPC .......................................... 177/199, 238, 244
See application file for complete search history.

(56) References Cited

U.S. PATENT DOCUMENTS

| | | | |
|---|---|---|---|
| 4,433,741 A * | 2/1984 | Ryckman, Jr. ................ 177/199 |
| 5,283,395 A | 2/1994 | Pitaud | |
| 5,510,581 A | 4/1996 | Angel | |
| 5,847,329 A | 12/1998 | Anthoine-Milhomme et al. | |
| 5,886,302 A | 3/1999 | Germanton et al. | |
| 5,929,391 A | 7/1999 | Petrucelli et al. | |
| 7,214,893 B2 * | 5/2007 | Sikula ........................... 177/238 |
| 7,441,466 B2 | 10/2008 | Linglin et al. | |
| 7,910,841 B2 | 3/2011 | Germanton | |
| D693,256 S * | 11/2013 | Chan .............................. D10/94 |
| 2004/0229575 A1* | 11/2004 | Chan et al. ................... 455/90.3 |

* cited by examiner

*Primary Examiner* — Randy W Gibson
(74) *Attorney, Agent, or Firm* — Howard IP Law Group, PC (57) ABSTRACT

A load cell assembly for an electronic scale may include a substantially flat plate having an outer portion and a load cell aperture defining an inner portion having a deflectable member. A sensor may be disposed on the deflectable member responsive to deflection of the deflectable member. A housing may be configured to engage the outer portion of the load cell and hold the load cell. A foot member may include a bottom portion for contacting the surface upon which the electronic scale is sitting and a top portion including an upwardly depending foot member wall for contacting the inner portion of the load cell and foot member snap fit engagement members configured to engage the inner portion of the load cell, the upwardly depending foot member wall and the foot member snap fit engagement members resisting lateral movement of the foot member relative to the load cell.

20 Claims, 9 Drawing Sheets

LOAD CELL ASSEMBLY FOR AN ELECTRICAL SCALE

PRIORITY

This application claims priority under 35 U.S.C. §119 to Chinese utility model patent serial no. 201220320935.4, filed Jul. 4, 2012, the disclosure of which is incorporated herein by reference in its entirety.

FIELD OF THE INVENTION

This invention relates generally to load cell assemblies, and more particularly to a load cell assembly for an electrical weight scale.

BACKGROUND OF THE INVENTION

Many electronic weighing scales use electrical sensors to provide electrical signals indicative of a weight applied to the scale. Many of these electronic scales use a set of levers which transmit an applied load to a single load cell. The load cell is typically constructed as a mechanically-deformable element which operates as a force transducer and an electronic strain sensor. When a load is applied to such a load cell, the load cell mechanically deforms and produces an electrical signal which is proportional to the load applied to the load cell. These lever arrangements, however, are overly complex, require close tolerance components, and must be properly aligned to function accurately.

Attempts have been made in the prior art to construct scales without levers. One such design includes a scale with a plurality of load cells. When a load is applied to the scale, the load is distributed among all the load cells. Electrical signals generated by each of the load cells are then summed up to obtain an accurate measure of the total load on the scale. The scales embodying a plurality of load cells also use a double-cantilever arrangement for retaining precision under eccentric load conditions. Two strain gauges are bonded to a flexure beam, whereby upon the application of a load, one gauge is placed in tension and the other gauge is placed in compression of an equal magnitude, so that additional moments created by transverse forces are cancelled. The signal generated by the two strain sensors bonded to the flexure beam is proportional to the sum of the bending moments on the beam at the center points of the gauges. Since the sensors are located on the beam at locations which are equi-distant from the beam's mid-point, a force pressing on the leading edges of the beam will be proportional to the product of the force and the distance between the sensors. Since the distance between the sensors is fixed, the signal will be proportional to the force even if the force is not exactly at the center of the flexure beam. These types of scales are not easily mass produced because they each contain a relatively large number of parts and each require considerable machining, grinding, tapping, screwing, assembly and post-mounting trimming operations which substantially increase their manufacturing costs.

Another type of load cell uses a flat flexure beam on which strain sensors are bonded. A flat U-shaped loading element is attached to one end of the flexure beam and a flat mounting element is attached to the other end of the flexure beam. A disadvantage with this type of load cell is that it also requires several mounting operations.

Accordingly, an improved load cell for a scale that is highly reliable yet substantially simple and economical to manufacture would be desirable.

SUMMARY OF THE INVENTION

A load cell assembly for an electronic scale may comprise a load cell, a sensor, a housing, and a foot member. The load cell 300 may include a substantially flat plate having an outer portion 310 and a load cell aperture 330 defining an inner portion 320 having a deflectable member 340. The sensor 630 may be disposed on the deflectable member 340 responsive to a deflection of the deflectable member 340. The housing 200 may be configured to engage the outer portion 310 of the load cell 300 and hold the load cell 300 in the housing substantially parallel to a surface upon which the electronic scale is sitting. The housing may include: a top plate 205; a downwardly depending housing wall 210 depending downward from the top plate 205 for receiving and preventing lateral movement of the outer portion 310 of the load cell 300; one or more housing planar bearing surfaces 240 for contacting and transmitting a load to the outer portion 310 of the load cell 300; and housing snap fit engagement members 230, 232 configured to engage the outer portion 310 of the load cell 300. The top plate may define a cavity 250 interior to the one or more housing planar bearing surfaces 240 for providing clearance for the deflection of the deflectable member 340 of the load cell 300. The foot member 500 may include: a bottom portion 510 for contacting the surface upon which the electronic scale is sitting and a top portion 530. The top portion 530 on the bottom portion 510 may include: an upwardly depending foot member wall 540 for contacting the inner portion 320 of the load cell 300 and foot member snap fit engagement members 550, 552 configured to engage the inner portion 320 of the load cell 300, the upwardly depending foot member wall 540 and the foot member snap fit engagement members 550, 552 resisting lateral movement of the foot member 500 relative to the load cell 300; and one or more foot member bearing walls 560, 562, 564 for contacting and receiving the load from the inner portion 320 of the load cell 300.

In an embodiment, the housing 200 may further include vertical flanges 220 that extend inward from the housing wall and which are configured to contact an outer perimeter of the load cell 300. The load cell 300 may be substantially rectangular and the load cell aperture 330 may be a single continuous aperture that defines the deflectable member 340 and a left beam 350 and a right beam 352 of the inner portion 320 of the load cell 300. In an embodiment, the upwardly depending foot member wall 540 is at least partially circumferential around a footprint of the inner portion 320 of the load cell 300. The one or more foot member bearing walls 560, 562, 564 of the top portion 530 of the foot member 500 may include one or more of a first bearing wall 560 adjacent to the left beam 350, a second bearing wall 564 adjacent to the right beam 352, and a third bearing wall 562 adjacent to a transverse section 354 of the inner portion 320 of the load cell 300. In an embodiment, the width of the upwardly depending foot member wall 540 of the top portion 530 of the foot member 500 is narrower than the width of the load cell aperture 330, thereby preventing the foot member wall 540 from contacting the outer portion 310 of the load cell 300. The sensor 630 may include first and second strain gauges, and the deflection of the deflectable member 340 places the first strain gauge into tension and the second strain gauge into compression.

The foot member 500 may further comprise a flange 525 extending circumferentially outward from the foot member. The load cell assembly may further comprise a housing cap 600 defining a cap aperture 610 for receiving the bottom portion 510 of the foot member 500, the cap aperture 610 having a larger width than the bottom portion 510 of the foot member 500 and a smaller width than the flange 525 of the foot member 500, thereby causing the load cell 300, the top portion 530 of the foot member 500, and the flange 525 of the foot member 500 to be captured within the housing 200 when the housing cap 600 is attached to the housing 200.

A load cell assembly for an electronic scale may comprise a load cell 300, a sensor 630, a housing 200, and a foot member 500. The load cell 300 may include a substantially flat plate having an outer portion 310 and a load cell aperture 330 defining an inner portion 320 having a deflectable member 340. The sensor 630 may be disposed on the deflectable member 340 responsive to a deflection of the deflectable member 340. The housing 200 may be configured to engage the outer portion 310 of the load cell 300 and hold the load cell 300 substantially parallel to a surface on which the electronic scale is sitting. The foot member 500 may include a bottom portion 510 for contacting the surface upon which the electronic scale is sitting and a top portion 530. The top portion 530 may include an upwardly depending foot member wall 540 for contacting the inner portion 320 of the load cell 300 and foot member snap fit engagement members 550, 552 configured to engage the inner portion 320 of the load cell 300, the upwardly depending foot member wall 540 and the foot member snap fit engagement members 550, 552 resisting lateral movement of the foot member 500 relative to the load cell 300.

An electronic scale 800 for displaying a weight of a load applied to the scale, may comprise a platform 810 and a plurality of load cell assemblies 820a, 820b, 820c, 820d attached to the platform 810 for elevating the platform 810 above a supporting surface, each of the load cell assemblies 820a, 820b, 820c, 820d supporting a portion of a load on the platform. Each of the load cell assemblies 820a, 820b, 820c, 820d may include: a load cell 300 including a substantially flat plate having an outer portion 310 and a load cell aperture 330 defining an inner portion 320 having a deflectable member 340; a sensor 630 disposed on the deflectable member 340 responsive to a deflection of the deflectable member 340; a housing 200 configured to engage the outer portion 310 of one or more load cells 300 and hold one or more load cells 300 substantially parallel to the supporting surface; and a foot member 500 including a bottom portion 510 for contacting the supporting surface and a top portion 530 on the bottom portion 510 including an upwardly depending foot member wall 540 for contacting the inner portion 320 of the load cell 300, foot member foot member snap fit engagement members 550, 552 configured to engage the inner portion 320 of the load cell 300, the upwardly depending foot member wall 540 and the foot member snap fit engagement members 550, 552 resisting lateral movement of the foot member 500 relative to the load cell 300, and one or more foot member bearing walls 560, 562, 564 for contacting and receiving the load from the inner portion 320 of the load cell 300 and transmitting the load to the bottom portion 510. The electronic scale 800 may also include a display assembly 830 for receiving electrical signals from the sensor 630 in each of the load cell assemblies 820a, 820b, 820c, 820d and displaying the weight of the load on the platform.

BRIEF DESCRIPTION OF THE DRAWINGS

For a detailed understanding of the present invention, reference should be made to the following drawings wherein.

DETAILED DESCRIPTION OF THE DRAWINGS

Figure 1:
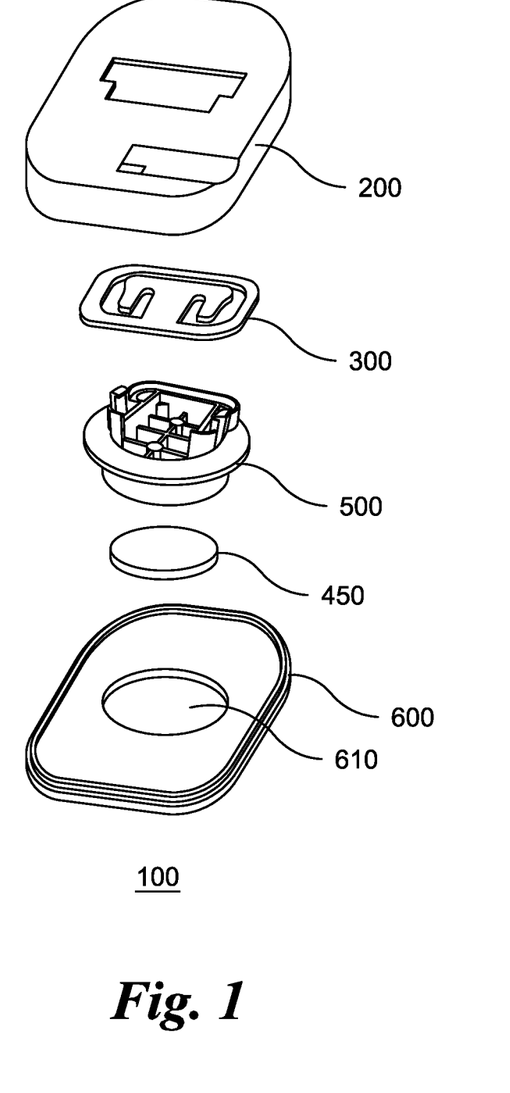
FIG. 1 is an exploded perspective view of an embodiment of a load cell assembly of the present disclosure.

Referring to FIG. 1, a load cell assembly 100 according to an embodiment of the present disclosure is shown. Generally, the load cell assembly 100 comprises a housing 200, a load cell 300, a foot member 500, and a housing cap 600. In an embodiment, the assembly may include a pad 450 that is mounted to the foot member 500. The pad may be rubberized to prevent movement of electronic scale to which the load cell assembly is attached, or in another embodiment the pad may be a material such as felt which will not mar or scratch the surface the scale is placed upon. The housing, housing cap, and foot member may typically be molded from plastic resin, or they may be made from any other suitable material.

Figure 8A:
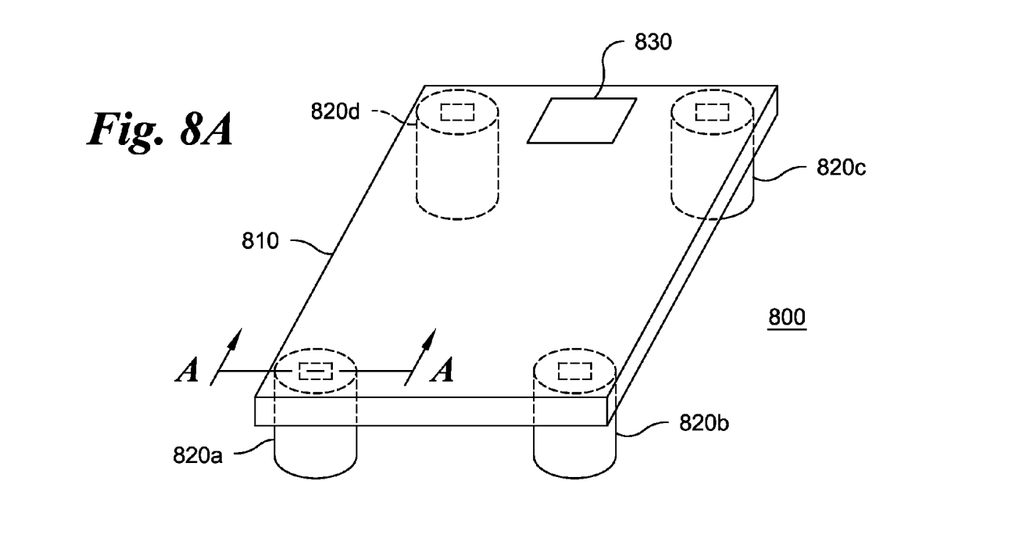
FIG. 8A is a perspective view of an electrical weighing scale employing a load cell assembly of the present disclosure.

In an embodiment, four load cell assemblies 820a, 820b, 820c, 820d may be attached to a scale platform 810 as shown in FIG. 8. When a weight is placed on the scale platform 810, a portion of the load caused by the weight is transmitted to each load cell assembly 820a, 820b, 820c, 820d. Specifically, the load transmitted to a load assembly is transmitted to the housing 200, which then transmits the load to the outer portion 310 of the load cell 300. The inner portion 320 of the load cell, which is integral with the outer portion 310 of the load cell 300, then transmits the load to the foot member 500. Otherwise stated, the foot member 500 provides upward force to the inner portion 320 of the load cell 300. The inner portion 320 of the load cell includes a deflectable member 340, which bends when force is transmitted to the inner portion 320 of the load cell 300. One or more sensors 630 on the deflectable member 340 provide an electrical signal that depends on the deflection. In an embodiment, the sensors 630 may be piezoresistive strain gauges whose resistance changes in response to deflection, which affects the output signal provided by the sensors. The electrical signal from each of the load cell assemblies 820a, 820b, 820c, 820d may then be routed to a processing and display assembly 830 that is in wired communication with the sensors 630. The display assembly 830 may include a power supply, as well as an IC chip that can receive the signals from the load cells. The IC chip may be configured to provide signals to the display that are responsive to the load detected by the load cells.

Figure 2:
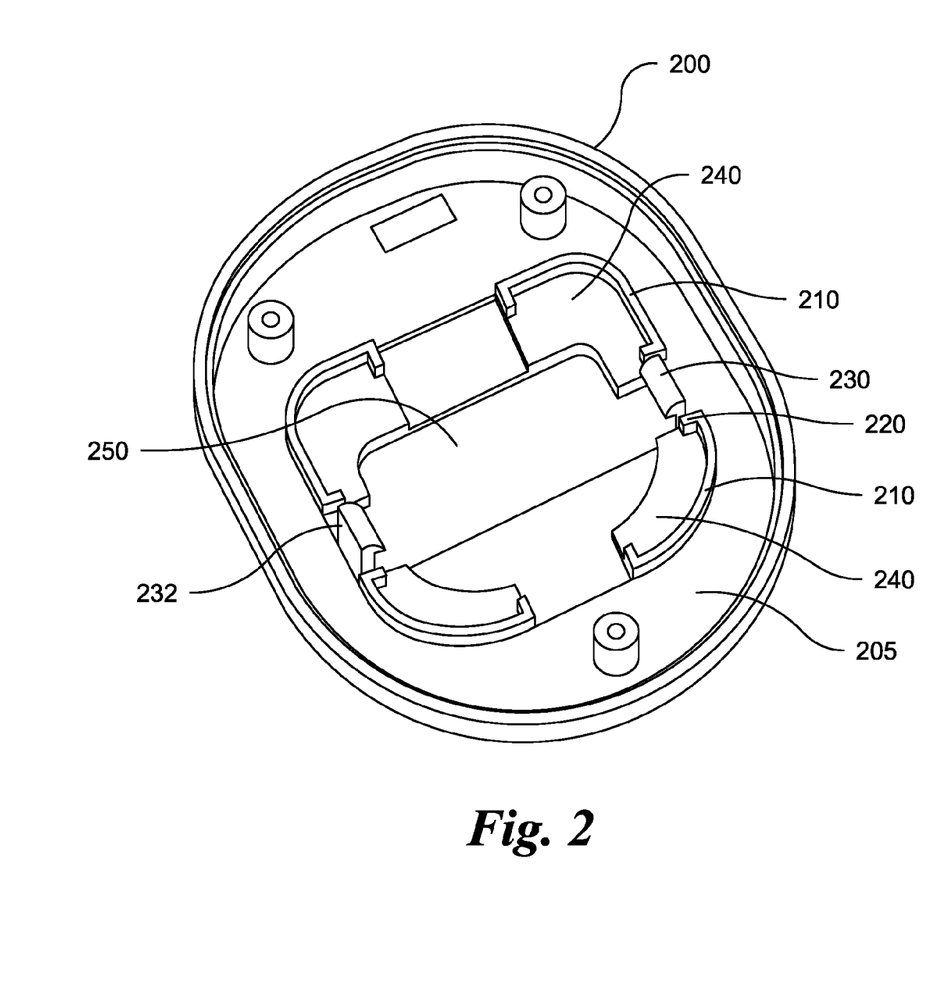
FIG. 2 is a perspective view of the housing of a load cell assembly according to an embodiment of the present disclosure.

FIG. 2 shows an interior portion of the housing 200. As shown in FIG. 2, the interior of the housing 200 includes a top plate 205 and a downwardly depending housing wall 210 that depends downward from the top plate 205. The housing wall 210 has a shape that is at least partially circumferential around the footprint of the load cell (i.e., substantially similar in shape to the perimeter of the load cell), which allows the load cell to be held within the housing, substantially parallel to a surface on which the scale is sitting. The housing wall prevents or resists lateral movement of the outer portion of the load cell. As will be understood, the housing wall 210 may also be fully circumferential around a footprint of the load cell. In addition, the housing wall may be continuous around the load cell, or it may be discontinuous, such that it is in effect several sections of wall around the perimeter of the load cell with gaps between one or more of the sections. In another embodiment, the housing wall 210 may include vertical flanges 220 that extend inward from the housing wall 210 and which make contact with an outer perimeter of the load cell 300 when it is placed within the housing 200. The housing 200 may include snap fit engagement members or arms 230, 232 configured to engage a perimeter of the outer portion of the non-deflectable portion of the load cell, which helps maintain the load cell in a stable position. The housing snap fit engagement members 230, 232 generally may be placed anywhere along the footprint of the wall and may be members that are integral to the wall and which extend from the wall, or they may be separate members that are not part of the wall. In an embodiment, the housing 200 may include one or more housing planar bearing surfaces 240 that make contact with and transmit load to the outer portion of the load cell. The housing top plate 205 may define a cavity 250 that is interior to the housing planar bearing surfaces 240, which provides clearance for load cell and foot member, and which provides clearance for deflection of the deflectable member of the load cell in response to an applied load. In an embodiment, the cavity may be an opening or aperture in the housing. The housing may be molded from plastic resin, or any other suitable material.

Figure 3:
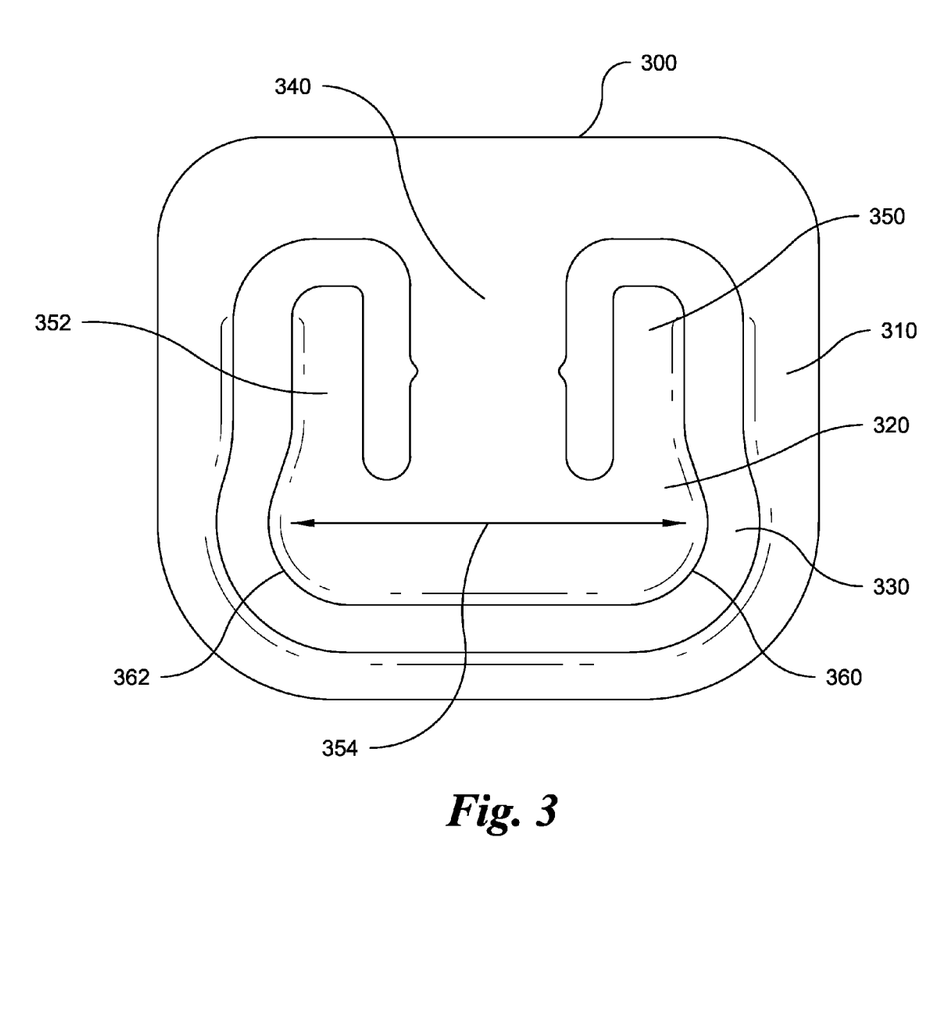
FIG. 3 is a plan view of a load cell of a load cell assembly according to an embodiment of the present disclosure.

FIG. 3 depicts a plan view of load cell 300. Load cell 300 is a substantially flat plate that is substantially rectangular, and includes an outer portion 310, an inner portion 320 which is "T-shaped" and generally in the interior of the load cell, and a load cell aperture 330 which defines the inner portion 320. In the embodiment shown in FIG. 3, the load cell aperture 330 is a single continuous aperture, but it may be more than one aperture. The single continuous aperture defines the T-shaped inner portion that includes a deflectable member 340, a left beam 350, a right beam 352, and curved perimeter portions 360, 362. A transverse section 354 of the inner portion 320 runs across the inner portion and connects the left beam 350, deflectable member 340, and right beam 352. The inner portion 320 is hinged to the outer portion 310 by the deflectable member 340, although in other embodiments the inner portion may be configured to that it is hinged to the outer portion by more than one member. Strain gauges (shown in FIG. 6) of a sensor 630 are mounted to the deflectable member 340 under a protective sealant 370 (shown in FIG. 4). The load cell may be made from an integral single plate of a metal material such as steel, which is capable of withstanding repeated deflections of the deflectable member, and deflecting sufficiently under loads to be measured to provide a suitable sensor response, or any other suitable material.

When a load from the housing is transmitted to the outer portion of the load cell, the outer portion of the load cell descends. The foot member 500 prevents the supported inner portion 320 from descending, thereby causing deflection of the deflectable member 340. The bending of the deflectable member 340 creates a strain within the piezoresistive strain gauges, which, in an embodiment, changes the resistance of the gauges, which is reflected in one or more electrical output signals from the gauges that are indicative of the load applied to the inner portion 320. The structure and operation of strain gauges, such as piezoresistive sensing structures, are well known in the art. In other embodiments, other types of known strain sensor arrangements can be employed, and strain sensors may be employed on the outer beams of the load cell of the present disclosure, if desired. In an embodiment, the sensor may include first and second strain gauges, and deflection of the deflectable member may place the first strain gauge into tension and the second strain gauge into compression.

Figure 4:
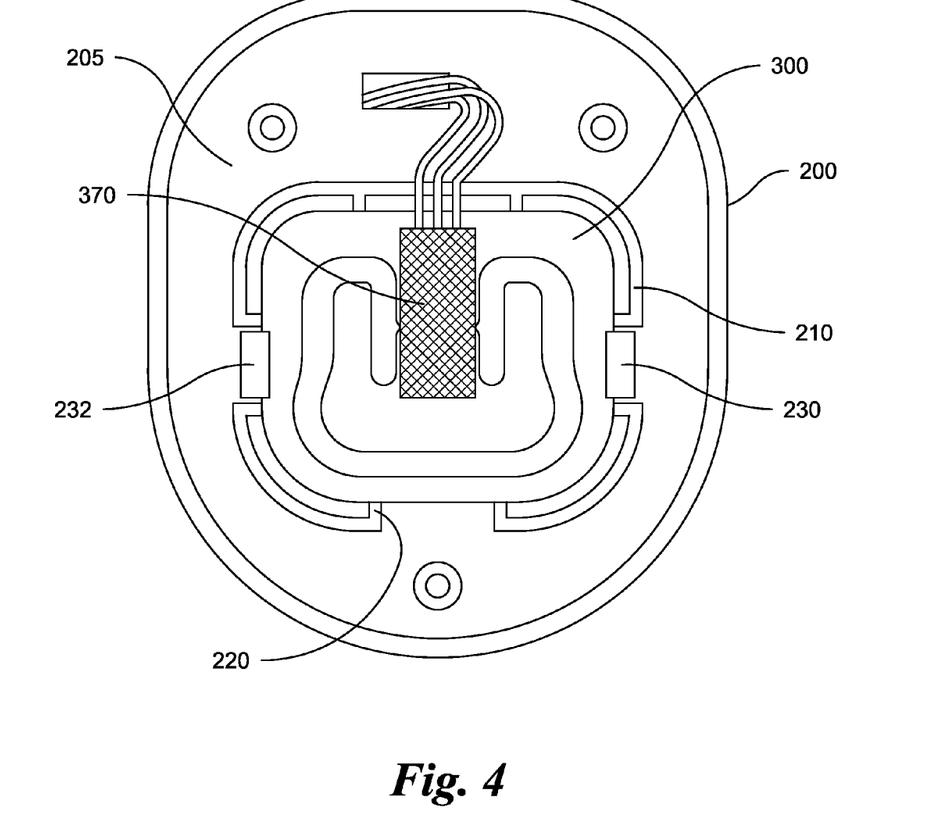
FIG. 4 is a plan view of a load cell in the housing of a load cell assembly according to an embodiment of the present disclosure.

FIG. 4 depicts a plan view of a load cell 300 fitted within housing 200. As shown, the load cell 300 sits within the housing wall 210, and vertical flanges 220 of the housing wall 210 make contact with the perimeter of the outer portion 310 of the load cell 300. Housing snap fit engagement members 230, 232 engage the outer portion 310 of load cell 300. The housing wall 210, vertical flanges 220, and housing snap fit engagement members 230, 232 all help resist or prevent movement of the load cell within the housing. In an embodiment, load cell 300 contacts housing planar bearing surfaces 240 of the housing (shown in FIG. 2), which cannot be seen in FIG. 4.

Figure 5A:
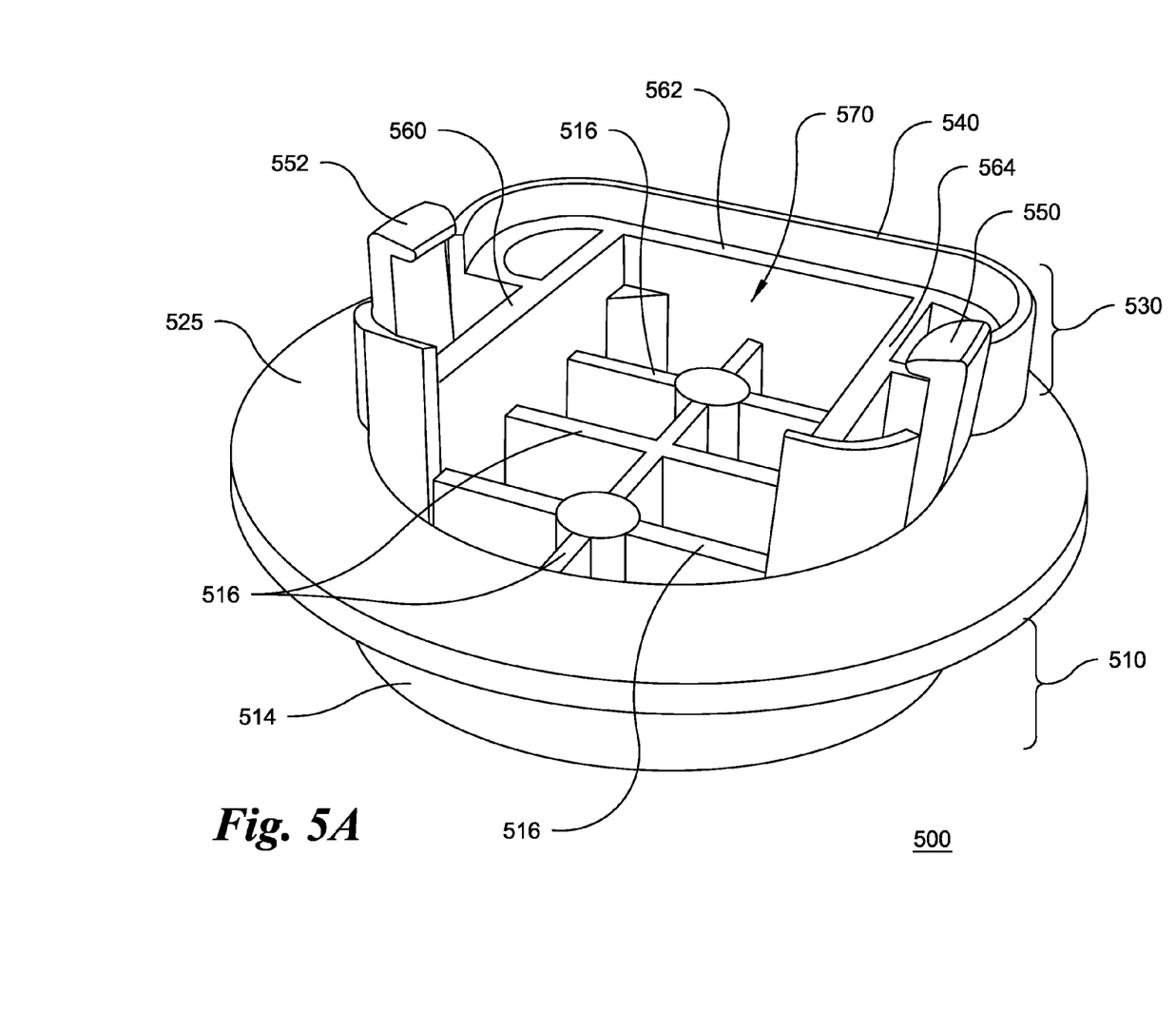
FIG. 5A is a perspective view of a foot member of a load cell assembly according to an embodiment of the present disclosure.
Figure 5B:
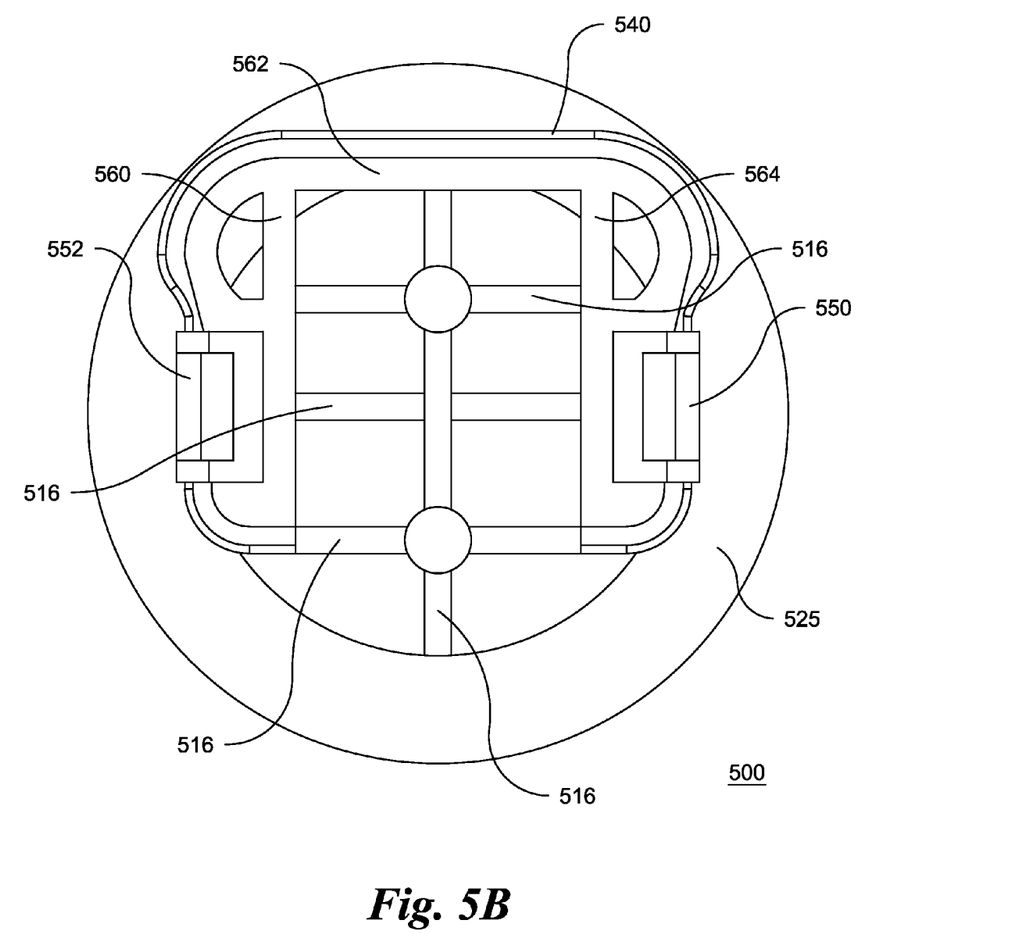
FIG. 5B is a plan view of a foot member of a load cell assembly according to an embodiment of the present disclosure.

FIGS. 5A and 5B depict a perspective and plan view, respectively, of foot member 500. The foot member 500 receives the force applied to the scale from the deflectable member 340 of the load cell. Foot member 500 includes a bottom portion 510 that contacts the surface the scale is sitting on or is placed on and a top portion 530. The bottom portion 510 may include a bottom wall 512, a side wall 514, and one or more ribs 516 depending upward from the bottom wall 512. In an embodiment, the side wall of the bottom portion 510 may be cylindrical, however in other embodiments the side wall of the bottom portion 510 can be any other shape such as square. The foot member 500 may also include a flange 525 that extends laterally (i.e., circumferentially outward) from the foot member. As will be understood, when the bottom portion 510 is placed through cap aperture 610 (as shown in FIG. 1) and the housing cap is attached to the housing, the flange 525 helps to capture the top portion 530 of the foot member and the load cell 300 within the housing. This may be accomplished if the bottom portion 510 has a smaller width than the cap aperture 610 so that it may pass through the aperture, and if the flange 525 of the foot member 500 has a larger width than cap aperture 610 to prevent the top portion 530 of the foot member from passing through the cap aperture 610.

The top portion 530 of the foot member 500 is on or above the bottom portion 510. The top portion includes an upward depending foot member wall 540, which may depend upward from one or both of the bottom portion 510 or the flange 525. The foot member wall 540 contacts the perimeter of the inner portion 320 of the load cell, which helps prevent or resist lateral movement of the foot member relative to the load cell. The foot member wall 540 may have a shape that is at least partially circumferential around a footprint of the inner portion 320. In an embodiment the foot member wall 540 may be shaped to extend continuously around a portion or all the perimeter of the inner portion 320, or in another embodiment the wall may be a discontinuous wall made up of several sections shaped to extend discontinuously around a portion or all of the perimeter of the inner portion 320. When the top portion 530 of the foot member 500 is attached to the inner portion 320 of the load cell 300, the foot member wall extends at least partially into the load cell aperture 330 (as shown in the section view of FIG. 7), which helps resist lateral movement of the inner portion of the load cell relative to the top portion of the foot member. Foot member snap fit engagement members 550, 552 (which may be snap fit arms) also may extend into and through the load cell aperture 330 and are configured to engage a perimeter of the deflectable member, thereby attaching the top portion of the foot member to the inner portion 320, which further assists in restricting or resisting lateral movement of the deflectable member relative to the top portion of the foot member. The foot member snap fit engagement members 550, 552 may be integral to the foot member wall and which extend from the foot member wall, or they may be separate members that are not part of the foot member wall. The foot member snap fit engagement members 550, 552 also help to ensure contact between one or more foot member bearing walls 560, 562, and 564 of the top portion 530 with the inner portion 320.

In an embodiment, the top portion 530 includes first, second, and third foot member bearing walls 560, 562, and 564. The first, second, and third bearing walls 560, 562, and 564 may depend upward from one or both of the bottom portion 510 (such as from a rib 516) or the flange 525, such that the top of the walls are configured to contact one or more of the left beam 350, the right beam 352, and the transverse section 354 of the load cell 300. Thus, in an embodiment, the top portion 530 of the foot member 500 may include a first bearing wall 560 depending upward from one or both of the bottom portion 510 and the flange 525, the top of which is configured to contact the left beam 350, a second bearing wall 564 depending upward from one or both of the bottom portion 510 and the flange 525, the top of which is configured to contact the right beam 352, and a third bearing wall 562 depending upward from one or both of the bottom portion 510 and the flange 525, the top of which is configured to contact the transverse section 354 of the inner portion 320 of the load cell 300. In an embodiment, the third bearing wall 562 depending upward from one or both of the bottom portion 510 and the flange 525 may be interior to and have the general shape of the foot member wall 540. As shown in FIG. 5B, the third bearing wall 562 may generally have a "U" shape. Force transmitted by the housing to the outer portion of the load cell is transmitted from the deflectable member of the load cell to the foot at the area of contact between the foot member bearing walls and the inner portion 320. The contact area on top of the foot member bearing walls also helps evenly distribute the force onto the inner portion of the load cell, which is believed to increase the durability of the load cell assembly. In an embodiment, the top portion may include a recessed portion 570 interior to the bearing walls 560, 562, and 564. The recessed portion may be configured to provide clearance for deflection of the deflectable member of the load cell when the foot member is attached to the load cell. As noted in relation to FIG. 1, foot member 500 may include a pad (not shown). The foot member may typically be molded from plastic resin, or it may be comprised of any other suitable material.

Figure 6:
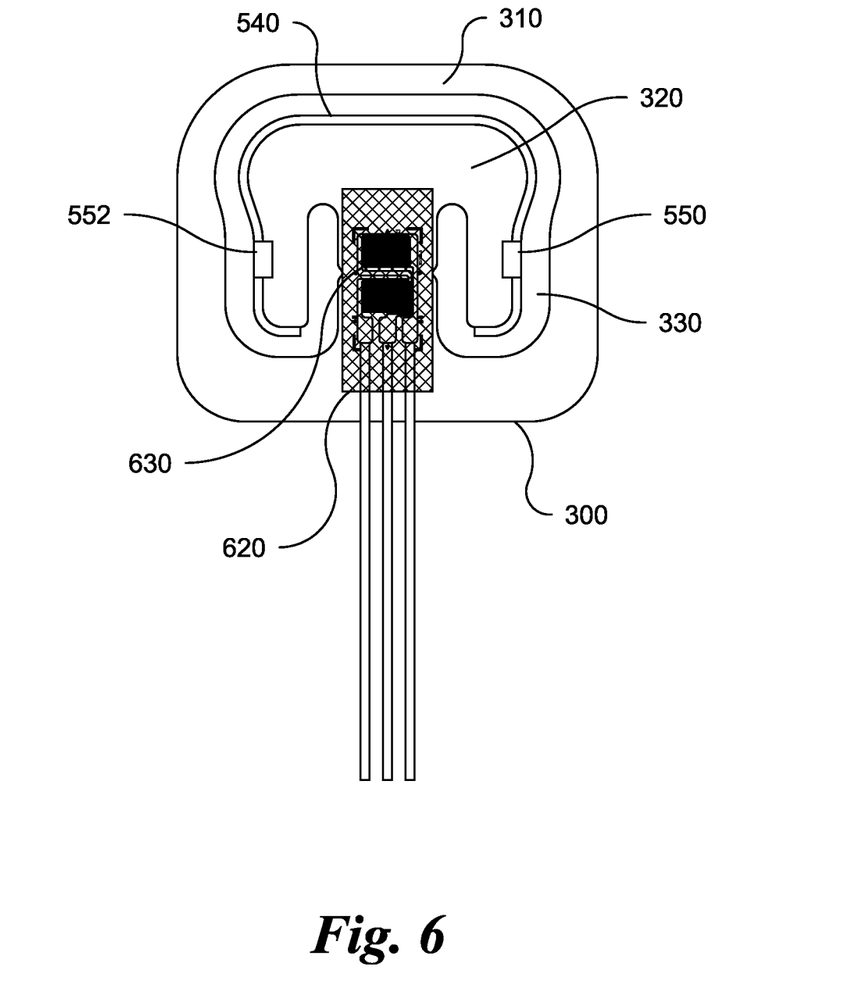
FIG. 6 is a plan view of a foot member attached to a load cell according to an embodiment of the present disclosure.

FIG. 6 depicts a plan view of foot member 500 attached to load cell 300 in which the center and bottom portions of the foot member are underneath the load cell. As shown, foot member wall 540 is partially circumferential of the inner portion 320. As described in relation to FIG. 5, foot member wall 540 extends at least partially into the load cell aperture 330 so that the wall is adjacent to the perimeter of the inner portion 320 of the load cell 300, which helps prevent lateral movement of the foot member relative to the inner portion of the load cell. In an embodiment, the foot member wall 540 extends into and through the load cell aperture on a first side of the deflectable member until the end of the wall is substantially flush with the surface of a second side of the deflectable member. As will be understood, if the foot member wall 540 extends too far beyond the planar surface of the inner portion 320 of the load cell 300, the foot member wall 540 may be susceptible to contacting the housing 200 during deflection. As will also be understood, the foot member wall 540 may prevent lateral movement of the load cell relative to the foot member even if the foot member wall only extends partially (and not fully) into the load cell aperture. Foot member snap fit engagement members 550, 552 of the top portion 530 of the foot member may extend into and through the load cell aperture 330 and help secure the foot member to the deflectable member of the load cell. In an embodiment, the width of the foot member wall 540 is narrower than the width of the load cell aperture, thereby preventing the foot member wall 540 from making contact with the outer portion of the load cell, which could interfere with the deflection of the deflectable member 340 and result in inaccurate weight readings. FIG. 6 also shows strain gauges of sensor 630 mounted to the deflectable member 340 under a protective sealant 620.

Figure 7:
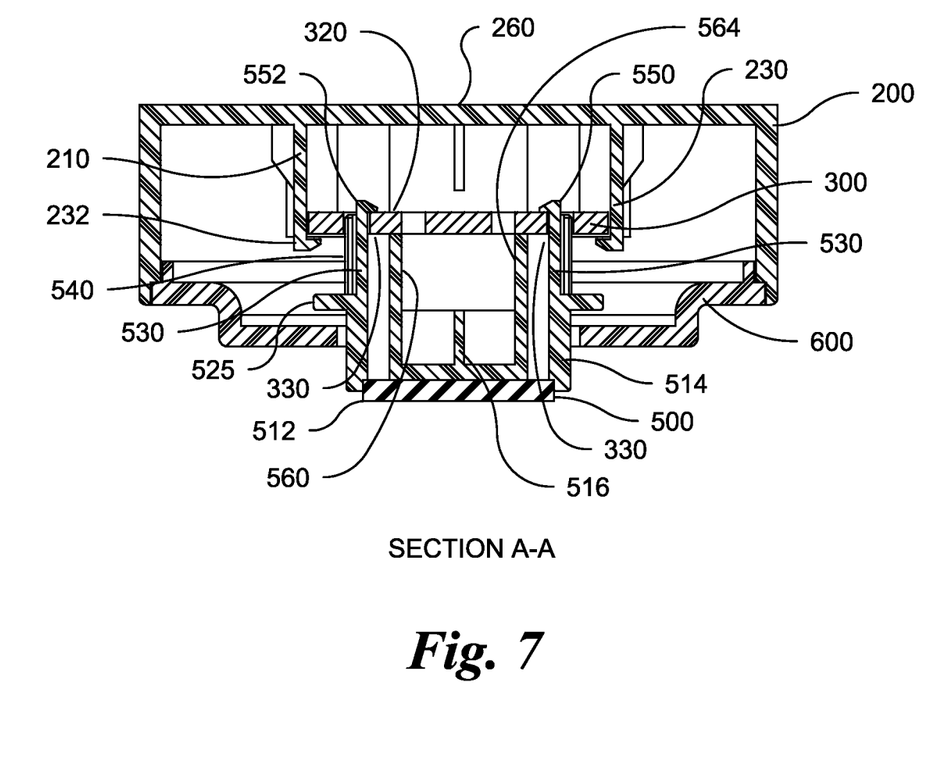
FIG. 7 is a partial cross-sectional view through line A-A of the load cell assembly shown in FIG. 8A.

FIG. 7 depicts a partial cross-sectional view through line A-A of the load cell assembly shown in FIG. 8A. The housing 200 includes housing wall 210 and housing snap fit engagement members 230, 232 that hold the load cell in place and enable it to resist movement. Foot member 500 includes a bottom portion 510 that extends through a cap aperture 610 (as shown in FIG. 1). The foot member 500 also includes a flange 525 that extends laterally from the foot member and helps keep the top portion 530 of the foot member 500 and the flange 525 captured within the housing 200. The top portion of the foot member includes a foot member wall 540 that extends into the load cell aperture 330 and makes contact with the load cell along a perimeter of the inner portion of the load cell. As noted, the foot member wall 540 helps resist lateral movement of the inner portion of the load cell relative to the top portion of the foot member. Foot member snap fit engagement members 550, 552 also may extend into and through the load cell aperture 330 when the top portion of the foot member is attached to inner portion 320, which further assists in resisting lateral movement of the inner portion of the load cell relative to the top portion of the foot member. The foot member snap fit engagement members 550, 552 also help to ensure contact between foot member bearing walls (560, 562, and 564 on FIG. 6) of the top portion 530 with the inner portion 320. The bottom portion 510 of the foot member 500 includes a bottom wall 512, side wall 514, and ribs 516. In the embodiment shown in FIG. 7, bearing walls 560 and 562 may coincide with ribs 516 in the bottom portion 510 of the foot member 500, in effect forming a single wall depending upward from the bottom wall 512.

The load cell assembly of the present disclosure provides both load support and load measurement in a single member that is easy to assemble and manufacture. In fact, the simple design of the load cell assembly has proven to be more durable than prior art load cell assemblies that use rigid fasteners to attach a load cell to a foot of a weighing scale. The ease of assembly and manufacture and durability of the load cell assembly of the present disclosure allows for it to be employed in many different applications involving the measurement of weight.

For example, FIG. 8A depicts an embodiment of a scale 800 that uses load cell assemblies made in accordance with an embodiment of the present disclosure. Generally, the scale 800 comprises a rigid platform 810, load cell assemblies 820a, 820b, 820c and 820d at each corner of the platform 810 that act as support members for elevating the platform above a supporting surface, and a data processing and display assembly 830. Each load cell assembly 820a-820d contains a load cell constructed in accordance with the present disclosure. The sensing arrangement of each load cell is coupled to the display assembly 830 via peripherally located conductors 835 (not shown). When a load is placed on the platform 810, the load is distributed among the load cells in each of the load cell assemblies 820. Each load cell provides an electrical signal which is indicative of the portion of the total load being supported by the load cell. The display assembly 830 includes electrical circuitry (not shown) for receiving the electrical signals generated by the load cells and summing the signals up to display the weight of the total applied load. Such electrical circuitry is well known in the art. The scale may also include one or more on/off power switches (not shown) within the load cell assemblies. The configuration and function of such switches are well known in the art, and such switches may, for example, be configured to power up the scale 800 upon the application of a predetermined load such as ten pounds. When the load is removed, the switch turns off the scale 800.

The load cell assemblies 820a-820d are substantially alike so the description of the load cell assembly 820a applies equally to the other load cell assemblies 820b-820d. Generally the load cell assembly 820a comprises a formed housing 200 for enclosing the mechanical and electrical components of the load cell assembly 820a. The housing 200 is preferably molded from a durable material such as plastic resin. However, the housing 200 can be fabricated from any suitable material known in the art. The load cell assembly 820a is attached to bottom surface of the platform 810 (at the corner) via the back wall 260 of the housing 200 using an adhesive or any other suitable attaching arrangement.

When a person stands or an object is placed on the platform 810, the load exerted by the person or object is applied to the load housing of each load cell assembly 820a-820d. Then the load is transferred from the housing of each load cell assembly to the outer portion of each load cell in each assembly. The load on the outer portion of each load cell causes the outer portion to descend, which causes deflection in the deflectable member of each load cell, which causes the strain sensing arrangement disposed thereon to provide an electrical signal that is indicative of the load applied to the load cell. As noted, the display assembly 830 may include electrical circuitry (not shown) for receiving the electrical signals generated by the load cells and summing the signals up to display the weight of the total applied load.

Figure 8B:
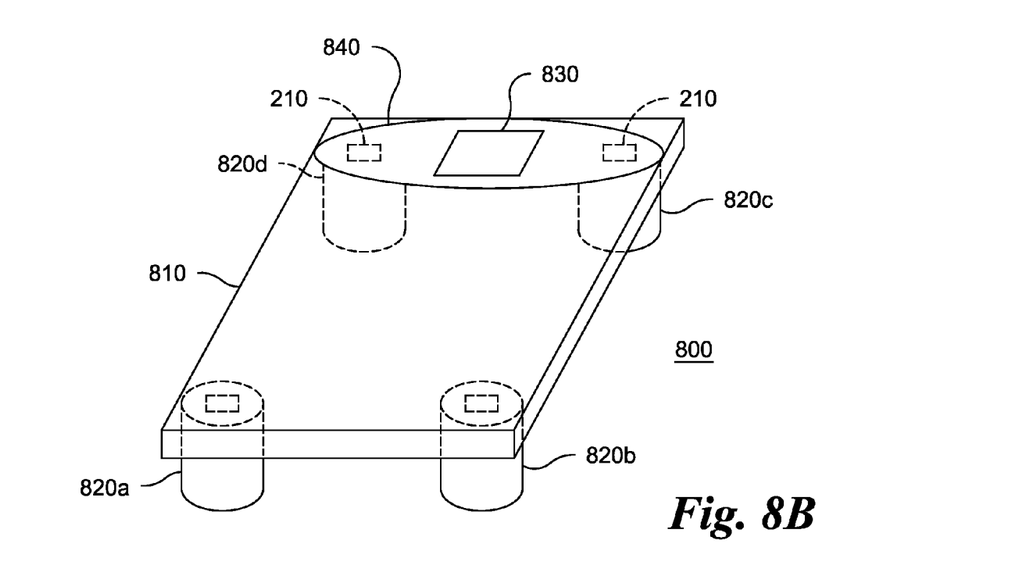
FIG. 8B is a perspective view of an electrical weighing scale employing a load cell assembly of the present disclosure.

In another embodiment shown in FIG. 8B, two load cell assemblies 820c, 820d and the processing and display assembly 830 all may be integrated into an elongated housing 840 that is attached to the platform 810 of the scale. In this embodiment, the downwardly depending wall 210 used in the individual load cell assemblies, which engages and holds the load cell 300, is formed at each end of the elongated housing 840 to hold a load cell at each end of the single housing. Then a foot member as described in relation to FIGS. 5A and 5B may be attached to each load cell as shown in FIG. 6. The elongated housing operates similarly to the individual load cell assemblies, except that it holds two load cells. In an embodiment in which the elongated housing 840 has a cap, the cap may include two apertures, one for each foot member 500 for each load cell 300. As will be understood, a number of different configurations are possible in which two load cells are contained within an elongated housing. For example, in an embodiment, the two individual load cells 820a, 820b shown in FIG. 8B may also be integrated into an elongated housing, at the other end of the scale. The housing would have two downwardly depending walls at the ends of the elongated housing, which the foot members would engage. In other embodiments, a scale could have an elongated housing along each side (e.g., one housing for 820a and 820d and a second housing for 820b and 820c) that includes two load cells. In this embodiment, the processing and display assembly 830 may be a separate device in its own enclosure, separate from the elongated housings for the load cells.

It should be understood that the embodiments described herein are merely exemplary and that a person skilled in the art may make many variations and modifications to these embodiments utilizing functionally equivalent elements to those described herein. For example, the circularly-shaped plate and the load cell assemblies may be any other suitable shape if desired.

Any and all such variations or modifications as well as others which may become apparent to those skilled in the art, are intended to be included within the scope of the invention as defined by the appended claims.

What is claimed is:

1. A load cell assembly for an electronic scale, comprising:
   a load cell including a substantially flat plate having an outer portion and a load cell aperture defining an inner portion having a deflectable member;
   a sensor disposed on the deflectable member responsive to a deflection of the deflectable member;
   a housing configured to engage the outer portion of the load cell and hold the load cell in the housing substantially parallel to a surface upon which the electronic scale is sitting, the housing including:
      a top plate;
      a downwardly depending housing wall depending downward from the top plate for receiving and preventing lateral movement of the outer portion of the load cell;
      one or more housing planar bearing surfaces for contacting, and transmitting a load to, the outer portion of the load cell; and
      housing snap fit engagement members configured to engage the outer portion of the load cell;
      wherein the housing defines a cavity interior to the one or more housing planar bearing surfaces for providing clearance for the deflection of the deflectable member of the load cell; and
   a foot member including:
      a bottom portion for contacting the surface upon which the electronic scale is sitting; and
      a top portion on the bottom portion including:
         an upwardly depending foot member wall for contacting the inner portion of the load cell and foot member snap fit engagement members configured to engage the inner portion of the load cell, the upwardly depending foot member wall and the foot member snap fit engagement members resisting lateral movement of the foot member relative to the load cell; and
         one or more foot member bearing walls for contacting, and receiving the load from, the inner portion of the load cell.

2. The load cell assembly of claim 1, wherein the housing further includes vertical flanges that extend inward from the housing wall and which are configured to contact an outer perimeter of the load cell.

3. The load cell assembly of claim 1, wherein the load cell is substantially rectangular and the load cell aperture is a single continuous aperture that defines the deflectable member and a left beam and a right beam of the inner portion of the load cell.

4. The load cell assembly of claim 1, wherein the upwardly depending foot member wall is at least partially circumferential around a footprint of the inner portion of the load cell.

5. The load cell assembly of claim 3, wherein said one or more foot member bearing walls of said top portion of the foot member includes one or more of a first bearing wall adjacent to the left beam, a second bearing wall adjacent to the right beam, and a third bearing wall adjacent to a transverse section of the inner portion of the load cell.

6. The load cell assembly of claim 1, wherein a width of the upwardly depending foot member wall of the top portion of the foot member is narrower than a width of the load cell aperture, thereby preventing said upwardly depending foot member wall from contacting said outer portion of the load cell.

7. The load cell assembly of claim 1, wherein said sensor includes a first strain gauge and a second strain gauge, and wherein the deflection of said deflectable member places said first strain gauge into tension and said second strain gauge into compression.

8. The load cell assembly of claim 1, wherein the foot member further comprises a flange extending circumferentially outward from the foot member; and further comprising a housing cap defining a cap aperture for receiving the bottom portion of the foot member, said cap aperture having a larger width than the bottom portion of the foot member and a smaller width than the flange of the foot member, thereby causing the load cell, the top portion of the foot member, and the flange of the foot member to be captured within the housing when the housing cap is attached to the housing.

9. A load cell assembly for an electronic scale, comprising:
a load cell including a substantially flat plate having an outer portion and a load cell aperture defining an inner portion having a deflectable member;
a sensor disposed on the deflectable member responsive to a deflection of the deflectable member;
a housing configured to engage the outer portion of the load cell and hold the load cell substantially parallel to a surface on which the electronic scale is sitting;
a foot member including a bottom portion for contacting the surface upon which the electronic scale is sitting and a top portion on the bottom portion, the top portion including an upwardly depending foot member wall for contacting the inner portion of the load cell and foot member snap fit engagement members configured to engage the inner portion of the load cell, the upwardly depending foot member wall and the foot member snap fit engagement members resisting lateral movement of the foot member relative to the load cell.

10. The load cell assembly of claim 9, wherein the housing includes:
a top plate;
a downwardly depending housing wall depending downwardly from the top plate for receiving, and preventing lateral movement of, the outer portion of the load cell;
one or more housing planar bearing surfaces for contacting, and transmitting a load to, the outer portion of the load cell; and
housing snap fit engagement members configured to engage the outer portion of the load cell,
wherein the housing defines a cavity interior to the one or more housing planar bearing surfaces for providing clearance for the deflection of the deflectable member of the load cell.

11. The load cell assembly of claim 9, wherein the load cell is substantially rectangular and the load cell aperture is a single continuous aperture that defines the deflectable member and a left beam and a right beam of the inner portion of the load cell.

12. The load cell assembly of claim 9, wherein the upwardly depending foot member wall is at least partially circumferential around a footprint of the inner portion of the load cell.

13. The load cell assembly of claim 9, wherein the top portion of the foot member further includes one or more foot member bearing walls for contacting, and receiving a load from, the inner portion of the load cell and a recessed portion interior to the one or more foot member bearing walls for providing clearance for the deflection of the deflectable member of the load cell.

14. The load cell assembly of claim 9, wherein a width of the upwardly depending foot member wall of the top portion of the foot member is narrower than the width of the load cell aperture, thereby preventing said upwardly depending foot member wall from contacting said outer portion of the load cell.

15. The load cell assembly of claim 9, wherein said sensor includes a first strain gauge and a second strain gauge, and wherein the deflection of said deflectable member places said first strain gauge into tension and said second strain gauge into compression.

16. The load cell assembly of claim 9, wherein the foot member further comprises a flange extending circumferentially outward from the foot member; and further comprising a housing cap defining a cap aperture for receiving the bottom portion of the foot member, said cap aperture having a larger width than the bottom portion of the foot member and a smaller width than the flange of the foot member, thereby causing the load cell, the top portion of the foot member, and the flange of the foot member to be captured within the housing when the housing cap is attached to the housing.

17. An electronic scale for displaying a weight of a load applied to said scale, comprising:
a platform;
a plurality of load cell assemblies attached to said platform for elevating said platform above a supporting surface, each of said load cell assemblies supporting a portion of a load on the platform, wherein each of said load cell assemblies includes:
a load cell including a substantially flat plate having an outer portion and a load cell aperture defining an inner portion having a deflectable member;
a sensor disposed on the deflectable member responsive to a deflection of the deflectable member;
a housing configured to engage the outer portion of one or more load cells and hold the one or more load cells substantially parallel to the supporting surface; and
a foot member including a bottom portion for contacting the supporting surface and a top portion including an upwardly depending foot member wall for contacting the inner portion of the load cell, foot member snap fit engagement members configured to engage the inner portion of the load cell, the upwardly depending foot member wall and the foot member snap fit engagement members resisting lateral movement of the foot member relative to the load cell, and one or more foot member bearing walls for contacting, and receiving the load from, the inner portion of the load cell and transmitting the load to the bottom portion; and
a display assembly for receiving electrical signals from said sensor in each of said load cell assemblies and displaying the weight of the load on the platform.

18. The electronic scale of claim 17, wherein the housing for each load cell assembly comprises:
- at least one downwardly depending housing wall for receiving, and preventing lateral movement of, the outer portion of the load cell, the housing wall being at least partially circumferential around a footprint of the load cell;
- housing snap fit engagement members configured to engage the outer portion of the load cell;
- one or more housing planar bearing surfaces for contacting, and transmitting the load to, the outer portion of the load cell; and
- a cavity interior to the one or more housing planar bearing surfaces for providing clearance for the deflection of the deflectable member of the load cell.

19. The electronic scale of claim 17, wherein the upwardly depending foot member wall is at least partially circumferential around a footprint of the inner portion of the load cell.

20. The electronic scale of claim 17, wherein the top portion of the foot member further includes one or more foot member bearing walls for contacting, and receiving the load from, the inner portion of the load cell and a recessed portion interior to the one or more foot member bearing walls for providing clearance for the deflection of the deflectable member of the load cell.

* * * * *